United States Patent
Cooper et al.

(10) Patent No.: US 10,146,626 B2
(45) Date of Patent: Dec. 4, 2018

(54) DETECTING AND HANDLING AN EXPANSION CARD FAULT DURING SYSTEM INITIALIZATION

(71) Applicant: Lenovo Enterprise Solutions (Singapore) Pte. Ltd., Singapore (SG)

(72) Inventors: Ralph S. Cooper, Durham, NC (US); Michael C. Elles, Apex, NC (US); Robert A. Fenoglio, Raleigh, NC (US); Paul Klustaitis, Durham, NC (US); Luis R. Quinones Sepulveda, Raleigh, NC (US); David Smith, Raleigh, NC (US); Jeffrey B. Williams, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 111 days.

(21) Appl. No.: 15/280,087

(22) Filed: Sep. 29, 2016

(65) Prior Publication Data

US 2018/0089047 A1 Mar. 29, 2018

(51) Int. Cl.
*G06F 11/14* (2006.01)
*G06F 11/30* (2006.01)
*G06F 13/40* (2006.01)
*G06F 13/42* (2006.01)

(52) U.S. Cl.
CPC ...... *G06F 11/1417* (2013.01); *G06F 11/3031* (2013.01); *G06F 13/4068* (2013.01); *G06F 13/4282* (2013.01)

(58) Field of Classification Search
CPC ............ G06F 11/0757; G06F 11/1417; G06F 11/2284; G06F 11/3031
USPC ........................................................ 713/1, 2
See application file for complete search history.

(56) References Cited

U.S. PATENT DOCUMENTS

| | | | | |
|---|---|---|---|---|
| 6,725,396 B2* | 4/2004 | Ahrens | ................. | G06F 11/006 713/2 |
| 6,968,477 B2* | 11/2005 | Mehta | ................. | G06F 11/2284 710/10 |
| 7,234,050 B2* | 6/2007 | Agan | ..................... | G06F 9/4411 710/8 |
| 7,266,727 B2* | 9/2007 | Crowell | .............. | G06F 11/2284 707/999.202 |

(Continued)

*Primary Examiner* — Joseph R Kudirka
(74) *Attorney, Agent, or Firm* — Jeffrey L. Streets (57) ABSTRACT

A method includes running a system mainline initialization process on a compute node that includes an expansion card with read-only memory storing expansion card initialization code. The method obtains and executes the expansion card initialization code from the read-only memory to perform initialization of the expansion card. The method further includes updating a current operational progress state of the expansion card initialization stored in non-volatile memory of the node as the expansion card initialization moves through a plurality of operational progress states, detecting a fault, such as a hung condition, during the expansion card initialization in response to exceeding a predetermined time period in the current operational progress state, and storing a fault indication in the non-volatile memory, wherein the fault indication identifies the card experiencing the fault. Optionally, the method may reset the node and bypass initializing the card associated with the fault indication.

20 Claims, 3 Drawing Sheets

(56) References Cited

U.S. PATENT DOCUMENTS

| | | | |
|---|---|---|---|
| 7,650,530 B2 * | 1/2010 | Harrington | G06F 11/1417 |
| | | | 714/34 |
| 8,621,192 B2 * | 12/2013 | Oyama | G06F 13/385 |
| | | | 710/301 |
| 2015/0268967 A1 * | 9/2015 | Baker | G06F 9/4405 |
| | | | 714/48 |

* cited by examiner

DETECTING AND HANDLING AN EXPANSION CARD FAULT DURING SYSTEM INITIALIZATION

BACKGROUND

Field of the Invention

The disclosure relates to system initialization of a compute node having one or more expansion cards.

Background of the Related Art

A modern compute node may experience a hang condition or "fault" prior to starting the operating system. This fault may be the result of a problem with initialization of an expansion card within the compute node, or a problem in communication between the expansion card and a device that is attached to the expansion card. Currently, when such a fault occurs, the compute node may stall or hang, such that control is never returned to the calling functions within the system mainline initialization process. The compute node may attempt an automatic restart, which may require a user to manually intervene to address the fault. However, a restart will often not recover the fault and the specific hardware component that is causing the initialization failure may not be identified.

BRIEF SUMMARY

One embodiment provides a method comprising running a system in-band, mainline initialization process on a compute node, wherein the compute node includes an expansion card with read-only memory storing expansion card initialization code, obtaining the expansion card initialization code from the read-only memory and executing the expansion card initialization code to perform initialization of the expansion card. The method further comprises updating a current operational progress state of the expansion card initialization stored in non-volatile memory of the compute node as the expansion card initialization moves through a plurality of operational progress states, detecting a fault during the expansion card initialization in response to exceeding a predetermined time period in the current operational progress state, and storing an indication of the fault in the non-volatile memory, wherein the indication of the fault identifies the expansion card experiencing the fault.

Another embodiment provides a computer program product comprising a non-transitory computer readable storage medium having program instructions embodied therewith, wherein the program instructions are executable by a processor to cause the processor to perform a method. The method comprises running a system mainline initialization process on a compute node, wherein the compute node includes an expansion card with read-only memory storing expansion card initialization code, obtaining the expansion card initialization code from the read-only memory and executing the expansion card initialization code to perform initialization of the expansion card. The method further comprises updating a current operational progress state of the expansion card initialization stored in non-volatile memory of the compute node as the expansion card initialization moves through a plurality of operational progress states, detecting a fault during the expansion card initialization in response to exceeding a predetermined time period in the current operational progress state, and storing an indication of the fault in the non-volatile memory, wherein the indication of the fault identifies the expansion card experiencing the fault.

DETAILED DESCRIPTION

One embodiment provides a method comprising running a system mainline initialization process on a compute node, wherein the compute node includes an expansion card with read-only memory storing expansion card initialization code, obtaining the expansion card initialization code from the read-only memory and executing the expansion card initialization code to perform initialization of the expansion card. The method further comprises updating a current operational progress state of the expansion card initialization stored in non-volatile memory of the compute node as the expansion card initialization moves through a plurality of operational progress states, detecting a fault during the expansion card initialization in response to exceeding a predetermined time period in the current operational progress state, and storing an indication of the fault in the non-volatile memory, wherein the indication of the fault identifies the expansion card experiencing the fault.

The compute node is preferably an enterprise level compute node, such that the compute node includes a service processor. For example, the compute node may be a server including one or more central processing units and a service processor. The service processor monitors the main system components and may start or stop the main system components. One of the central processing units executes the system mainline initialization process prior to booting an operating system.

The compute node may have one or more expansion cards. Non-limiting examples of expansion cards may be selected from a network adapter, external storage expansion card, graphics processing unit, or an internal disk controller. In one option, the expansion card interfaces with a central processing unit on the compute node over a serial computer expansion bus, such as a peripheral component interconnect express (PCIe) bus. Accordingly, in some embodiments the expansion card may be referred to as a PCIe device.

The system mainline initialization process is typically defined by system in-band initialization code that is stored in a system boot read-only memory (ROM) on the compute node, such as on a motherboard. For example, the system mainline initialization code may be a part of a firmware interface, such as a basic input output system (BIOS) or a unified extensible firmware interface (UEFI). The step of running a system mainline initialization process on the compute node may include a central processing unit of the compute node reading system mainline initialization code stored in the system boot read-only memory on the compute node and executing the system mainline initialization code on the central processing unit. The system mainline initialization process may cause execution of expansion card initialization code that is retrieved from read-only memory (ROM) on each expansion card, respectively.

Various embodiments provide non-volatile memory on the compute node for storing an operational progress state for each of a plurality of expansion cards within the compute node. As the expansion card initialization code for each expansion card is executed by a central processing unit of the compute node, the respective expansion card will move through a plurality of operational progress states. The non-volatile memory may store a record for each expansion card, such that the record for each given expansion card is updated as that expansion card moves from one operational progress state to the next operational progress state. For example, a particular expansion card may progress through the following operational progress states as the expansion card initialization proceeds to completion:

Sample Progress Codes for I/O Device—
08x0A2D1 Device Previously Present and False bit Set?
08x0A2D2 Install HW Protocol Interface
08x0A2D3 Load low level HW Config Driver
08x0A2D4 Get Device VPD
08x0A2D5 Load Device PCIe Capabilities
08x0A2D6 Done Processing Device Config When a fault is detected, an indication of the fault may be stored in the non-volatile memory, wherein the indication of the fault identifies the expansion card experiencing the fault. In one option, the indication of the fault further identifies the operational progress state of the expansion card at the time the fault was detected. For example, the indication of the fault may be a flag or a bit stored in a record where the operational progress state for the expansion card is stored in the normal course of initializing the expansion card. As an additional function, the indication of the fault may be recorded in a separate record, such as a message log, in which each indication of a fault will identify the expansion card and the operational progress state of the expansion card at the time that the fault was detected.

In a further embodiment of the method, a service processor generates a fault during the expansion card initialization in response to exceeding a predetermined time period in the current operational progress state. For example, the service processor may measure an amount of time that the expansion card initialization spends in any given operational progress state, and compare that amount of time to the predetermined time period. In one option, the step of detecting a fault during the expansion card initialization in response to exceeding a predetermined time period in the current operational progress state, includes identifying a predetermined time period that is associated with a device type of the expansion card and the current operational progress state of the expansion card. Optionally, the service processor may have access to data, such as a data table, that specifies a predetermined amount of time that is normal for each operational progress state of each type of expansion card in the compute node. If a measured amount of time spent in a given operational progress state of a given expansion card type exceeds the predetermined amount of time that is normal for the given operational progress state and expansion card type, then the service processor may determine that a fault has occurred.

In one option, the method may further comprise the service processor identifying the operational progress state of the expansion card at the time of the fault, and outputting a message to a user of the compute node, wherein the message identifies the expansion card experiencing the fault and the operational progress state of the identified expansion card at the time of the fault. Outputting such a message would allow a user to take prompt action to address the fault, such as replacing, repairing, rebooting or updating firmware for the expansion card experiencing the fault.

In another option, the method may further comprise the service processor causing a central processing unit on the compute node to exit from the expansion card initialization process in response to detecting the fault, and the central processing unit, after exiting from the expansion card initialization process, completing the system mainline initialization process and starting a boot process for the compute node. In this manner, the system mainline initialization process is not hung waiting for the expansion card initialization process to complete.

In a still further option, the method may further comprise the service processor causing a central processing unit on the compute node to exit from the expansion card initialization process in response to detecting the fault, and the central processing unit, after exiting from the expansion card initialization process, starting a subsequent instance of the system mainline initialization process. While starting a subsequent instance of the system mainline initialization process will void any progress made in initializing the system, the subsequent instance may be handled in view of the fault. For example, the method may comprise identifying, during the subsequent instance of the system mainline initialization process, the indication of a fault stored in the non-volatile memory, and automatically bypassing, during the subsequent instance of the system mainline initialization process, the expansion card identified in the indication of a fault. When the expansion card is automatically bypassed, the central processing unit will not execute expansion card initialization code in the read-only memory of the identified expansion card. Accordingly, the subsequent instance of the system mainline initialization process occurs as if the expansion card experiencing the fault was not present in the compute node. A subsequent mainline initialization process may start following a power cycle or reboot of the central processing unit.

In yet another option, the method may further comprise disabling a link to the expansion card in response to detecting the fault during the initialization of the expansion card. If the link is disabled, the method may not initialize a bus identifier for the expansion card.

In one embodiment, expansion card initialization occurs during a driver execution environment (DXE) state. For example, during boot, a Unified Extensible Firmware Interface (UEFI) will advance through a series of operational progress states as follows:

| UEFI Checkpoint Progress Codes and States | |
|---|---|
| Checkpoint Code | Operational Progress State |
| 0x07 | 'POST Started = Start of Pre-EFI (PEI)" |
| 0x08 | 'Starting Memory Initialization" |
| ** Start of out-of-band Service Processor Monitoring ** | |
| 0x09 | 'Start of Driver Execution Environment (DXE) and PEI Complete' |
| 0x11 | 'End of POST—Boot Device Selection Start' |
| 0x14 | 'Control passed to UEFI O/S Loader' |
| 0x10 | 'SMBIOS tables ready' |
| 0x15 | 'Booted UEFI OS' |
| ** End of out-of-band Service Processor Monitoring - Boot Complete ** | |

Accordingly, expansion card initialization is preferably performed during the DXE state and before the end of the POST.

Another embodiment provides a computer program product comprising a non-transitory computer readable storage medium having program instructions embodied therewith, wherein the program instructions are executable by a processor to cause the processor to perform a method. The method comprises running a system mainline initialization process on a compute node, wherein the compute node includes an expansion card with read-only memory storing expansion card initialization code, obtaining the expansion card initialization code from the read-only memory and executing the expansion card initialization code to perform initialization of the expansion card. The method further comprises updating a current operational progress state of the expansion card initialization stored in non-volatile memory of the compute node as the expansion card initialization moves through a plurality of operational progress states, detecting a fault during the expansion card initialization in response to exceeding a predetermined time period in the current operational progress state, and storing an indication of the fault in the non-volatile memory, wherein the indication of the fault identifies the expansion card experiencing the fault.

The foregoing computer program product may further include program instructions for implementing or initiating any one or more aspects of the methods described herein. Accordingly, a separate description of the methods will not be duplicated in the context of a computer program product.

Figure 1:
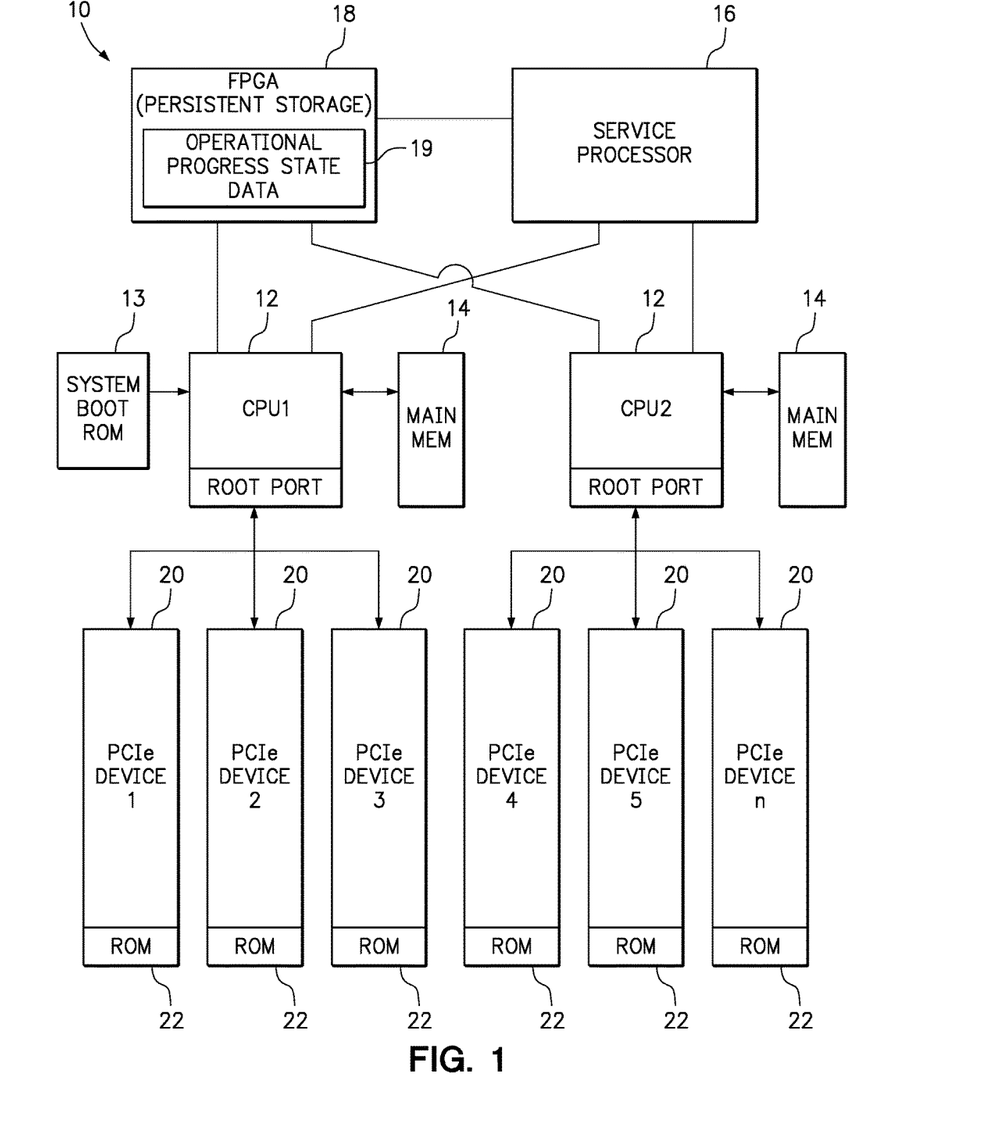
FIG. 1 is a diagram of a compute node.

FIG. 1 is a diagram of a compute node 10 according to one non-limiting embodiment. The compute node 10 includes two CPUs 12 (CPU1 and CPU2), main memory 14, a service processor (SP) or management controller 16, persistent storage 18 that is accessible to both the service processor 16 and each of the CPUs 12 and a plurality of PCIe devices (PCIe Devices 1-n) 20. The CPU(s) 12 may be referred to as the "system main processor(s)", since they are responsible for executing the operating system (OS) and various user applications. When the computer node 10 is powered on, these CPUs 12 perform the initialization steps required to prepare for, boot and run the operating system. By contrast, the service processor 16 runs independently of the CPUs 12 and executes its own operating system and applications in order to perform an out-of-band role that includes controlling and monitoring the CPUs 12 and supporting hardware. The service processor 16 is automatically powered on and initialized into running state when external power is applied to the chassis even if the compute node 10 has not been powered on.

The CPUs 12 and the service processor 16 each have access to the persistent (non-volatile) storage 18, which stores operational progress state data (i.e., a state table) that represents the status of the initialization process for each PCIe device 20. The CPUs 12 execute system initialization code resident in the System Boot ROM 13, as well as expansion card initialization code resident in the BIOS ROM 22 that is part of each PCIe device 20. The service processor 16 executes a separate operating system and program code that monitors the progress of the expansion card initialization process. The persistent storage 18 stores a record of the initialization progress of each PCIe device 20, such that the operational progress state data will persist across a power cycle of the CPUs 12 and PCIe devices 20. This persistence of the operational progress data allows the service processor 16 identify previous PCIe device failures across a power cycle or reboot of the CPUs 12.

The "system mainline initialization process" is executed by the CPUs 12 using the firmware code in the System Boot ROM 13 and occurs during initialization prior to booting the operating system. As part of the system mainline initialization process, the CPUs 12 call firmware resident in the BIOS ROM 22 of each PCIe device 20. During execution in the PCIe device firmware, a hardware or firmware problem could be encountered for which no recovery operation succeeds. For example, an application specific integrated circuit (ASIC) of a particular one of the PCIe devices 20 may fail to become ready. In this case, the system mainline initialization process may stall or hang.

When any of the PCIe devices 20 experiences an initialization failure, the service processor 16 would place an indication in the persistent storage 18 identifying the specific failed PCIe device 20 along with the details of the operational progress state data (table) 19 describing the initialization progress at the time of the failure. This stored failure indication may, for example, be saved in a service processor message log on the persistent storage 18. In a subsequent initialization of the compute node 10, the persistent storage 18 would be read or scanned by the service processor 16, and any of the PCIe devices 20 that are identified in the persistent storage 18 as having failed would be bypassed during the initialization.

In one example, the service processor 16 may determine that the initialization of a PCIe device 20 or other expansion card has stalled or hung by implementing a timer to monitor the PCIe device operational progress state data 19 contained in the persistent storage 18. An amount of time allotted for each operational progress state may be specified as appropriate to the PCIe device type. Accordingly, if the service processor timer expires and the expected operational progress state of a specific PCIe device has not been confirmed in the persistent storage 18, then the service processor 16 would mark the failed status for the specific PCIe device in persistent storage 18, and signal the CPUs 12 to restart system initialization.

Embodiments include a method and an apparatus for exiting a hung expansion card initialization process and returning to the system mainline initialization process. One or more features may be implemented through modification of the service processor out-of-band system management functions, the PCIe device BIOS ROM code, and/or the system mainline initialization code. No changes are required to the Operating System.

Figure 2:
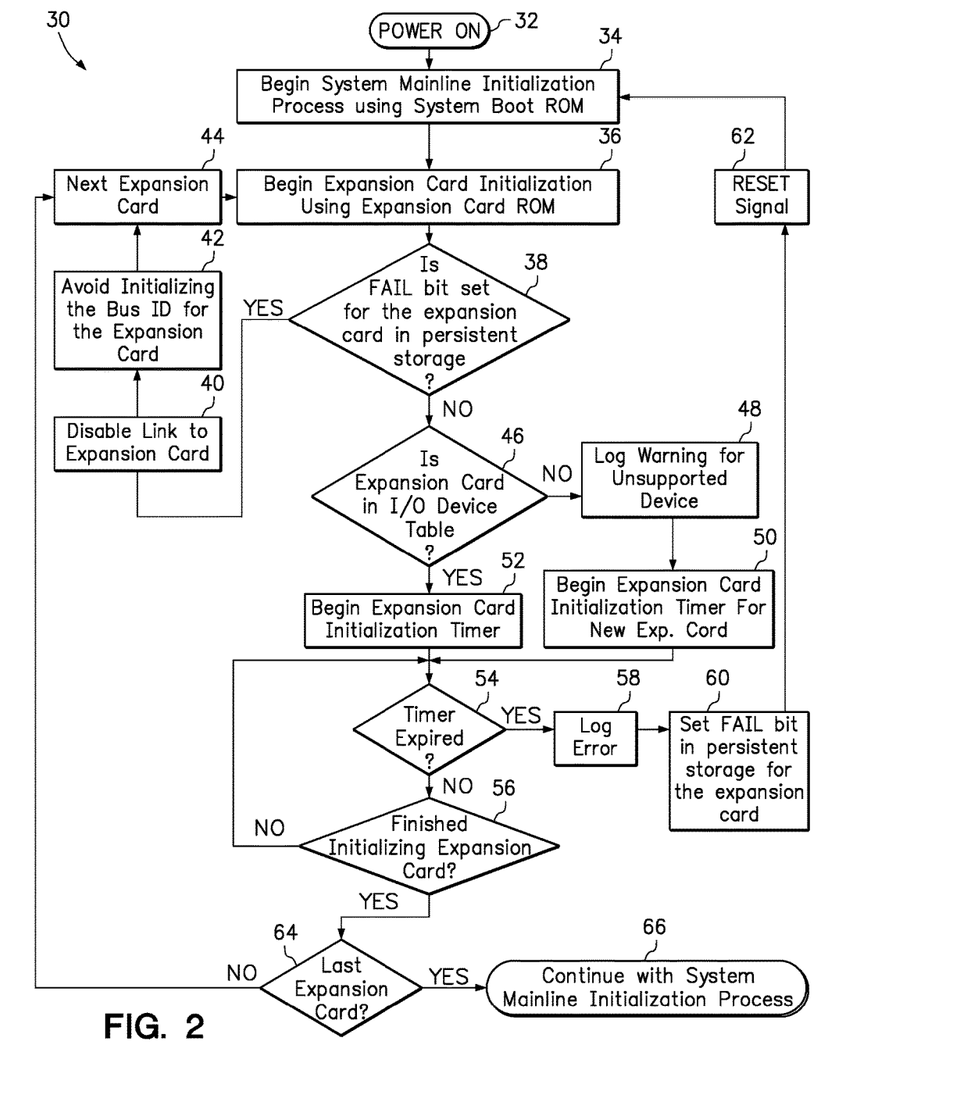
FIG. 2 is a flowchart of a method according to one embodiment.

FIG. 2 is a flowchart of a method 30 of system initialization according to one embodiment. After powering on a compute node in step 32, the method begins a system mainline initialization process using the System Boot ROM code in step 34. In step 36, the method begins expansion card initialization using expansion card initialization code stored in the expansion card ROM. Both the System Boot ROM code and the expansion card ROM code are executed by one or more CPUs of the compute node. Then, in step 38, the method determines whether there is a FAIL bit set for the expansion card in the persistent storage of the compute node. The FAIL bit is used to indicate that the particular expansion card failed to initialize properly and became hung during the previous initialization process.

If a FAIL bit was set for a particular expansion card (as determined in step 38), then the method follows the "YES" branch to disable the link to the expansion card in step 40, avoid initializing the Bus ID for the expansion card in step 42, and then advancing forward to handle the next expansion card in step 44.

If a FAIL bit was not set for a particular expansion card (as determined in step 38), then the method follows the "NO" branch to step 46, where the method determines whether the particular expansion card is identified in an expansion card device data (I/O device table) stored in the persistent storage device. If the expansion card is not identified in the data, then the method logs a warning that the device is unsupported in step 48, and begins an expansion card initialization timer for the new expansion card in step 50. Conversely, if the expansion card is identified in the data, then the method begins an expansion card initialization timer for the expansion card in step 52.

In step 54, the method determines whether the relevant timer has expired. If the timer has not expired, then step 56 determines whether the expansion card initialization has finished. If the timer has not expired and the expansion card initialization has not finished, then the method returns to step 54. If the expansion card initialization finishes before the timer expires, then the method continues to step 64. If step 64 determines that there are more expansion cards to be initialized, then the method returns to step 44 to initialize the next expansion card. However, if step 64 determines that the last expansion card has been initialized, then step 66 continues with the system mainline initialization process. However, if the timer expires per step 54 prior to the expansion card finishing its initialization per step 56, the step 58 logs an error and step 60 sets a FAIL bit in the persistent storage in association with the expansion card. For example, the FAIL bit may be stored in a data record for the particular expansion card. In step 62, the method may send a RESET signal to the CPUs, such that the system mainline initialization process begins over again in step 34.

Figure 3:
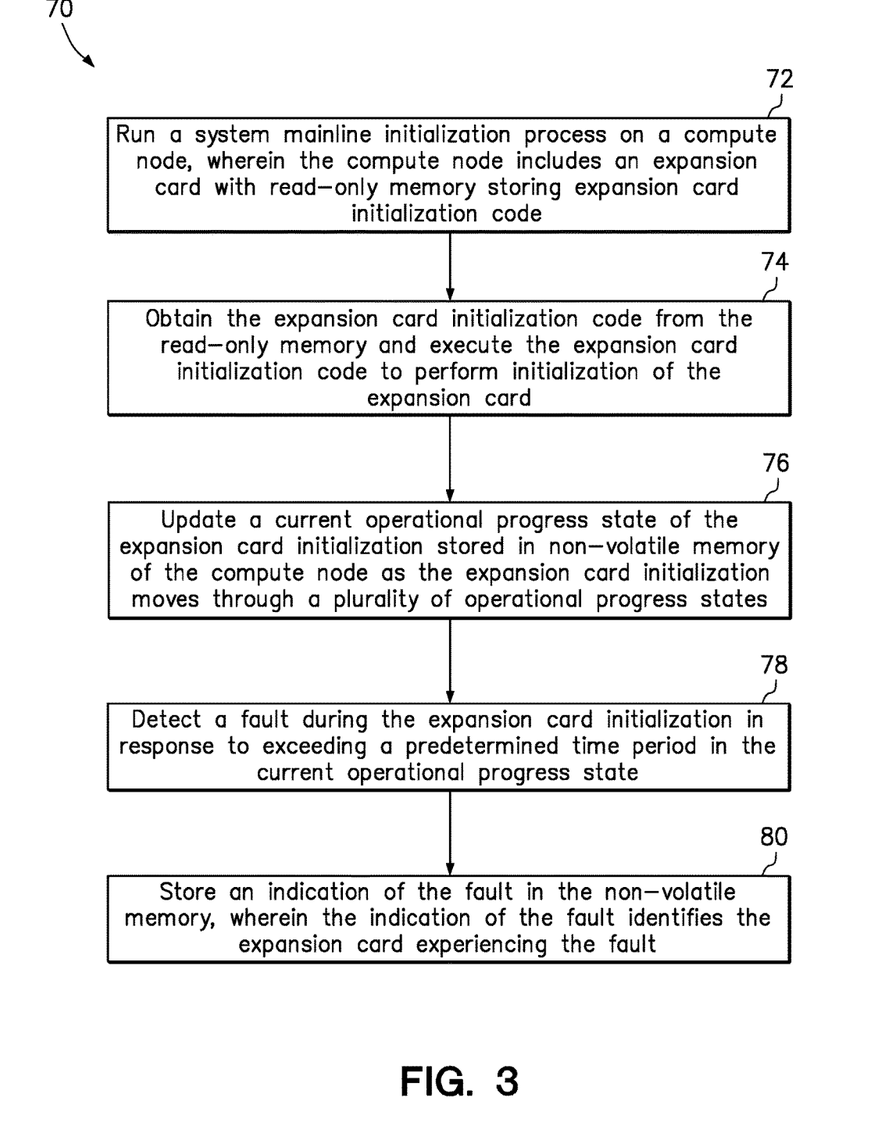
FIG. 3 is a flowchart of a method according to another embodiment.

FIG. 3 is a flowchart of a method 70 of system initialization according to another embodiment. In step 72, the method runs a system mainline initialization process on a compute node, wherein the compute node includes an expansion card with read-only memory storing expansion card initialization code. In step 74, the method obtains the expansion card initialization code from the read-only memory and executes the expansion card initialization code to perform initialization of the expansion card. In step 76, the method updates a current operational progress state of the expansion card initialization stored in non-volatile memory of the compute node as the expansion card initialization moves through a plurality of operational progress states. Then, in step 78, the method detects a fault during the expansion card initialization in response to exceeding a predetermined time period in the current operational progress state. In step 80, the method stores an indication of the fault in the non-volatile memory, wherein the indication of the fault identifies the expansion card experiencing the fault.

As will be appreciated by one skilled in the art, embodiments may be implemented as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
running a system mainline initialization process on a compute node, wherein the compute node includes an expansion card with read-only memory storing expansion card initialization code;
obtaining the expansion card initialization code from the read-only memory and executing the expansion card initialization code to perform initialization of the expansion card;
updating a current operational progress state of the expansion card initialization stored in non-volatile memory of the compute node as the expansion card initialization moves through a plurality of operational progress states;
detecting, by a service processor in the compute node, a fault during the expansion card initialization in response to exceeding a predetermined time period in the current operational progress state;
storing an indication of the fault in the non-volatile memory, wherein the indication of the fault identifies the expansion card experiencing the fault;
the service processor causing a central processing unit on the compute node to exit from the expansion card initialization process in response to detecting the fault; and
the central processing unit, after exiting from the expansion card initialization process, completing the system mainline initialization process and starting a boot process for the compute node.

2. The method of claim 1, wherein the expansion card interfaces with a central processing unit on the compute node over a serial computer expansion bus.

3. The method of claim 2, wherein the serial computer expansion bus is a peripheral component interconnect express bus.

4. The method of claim 1, wherein the indication of the fault further identifies the operational progress state of the expansion card at the time the fault was detected.

5. The method of claim 1, wherein detecting a fault during the expansion card initialization in response to exceeding a predetermined time period in the current operational progress state, includes identifying a predetermined time period that is associated with a device type of the expansion card and the current operational progress state of the expansion card.

6. The method of claim 1, further comprising:
the service processor identifying the operational progress state of the expansion card at the time of the fault; and
outputting a message to a user of the compute node, wherein the message identifies the expansion card experiencing the fault and the operational progress state of the identified expansion card at the time of the fault.

7. The method of claim 1, wherein the non-volatile memory stores an operational progress state for each of a plurality of expansion cards within the compute node.

8. The method of claim 1, wherein the system mainline initialization process is executed by a central processing unit on the compute node prior to booting an operating system.

9. The method of claim 1, wherein running a system mainline initialization process on a compute node, includes executing a firmware interface stored in read-only memory on the compute node.

10. The method of claim 9, wherein the firmware interface is selected from a basic input output system and a unified extensible firmware interface.

11. The method of claim 1, wherein the expansion card is selected from a network adapter, external storage expansion card, graphics processing unit, or an internal disk controller.

12. The method of claim 1, further comprising:
disabling a link to the expansion card in response to detecting the fault during the initialization of the expansion card.

13. The method of claim 1, wherein storing an indication of the fault in the non-volatile memory, includes saving the indication of the fault in a message log.

14. The method of claim 1, wherein running a system mainline initialization process on a compute node, includes a central processing unit of the compute node reading system mainline initialization code stored in system boot read-only memory on the compute node and executing the system mainline initialization code on the central processing unit.

15. A method, comprising:
running a system mainline initialization process on a compute node, wherein the compute node includes an expansion card with read-only memory storing expansion card initialization code;
obtaining the expansion card initialization code from the read-only memory and executing the expansion card initialization code to perform initialization of the expansion card;
updating a current operational progress state of the expansion card initialization stored in non-volatile memory of the compute node as the expansion card initialization moves through a plurality of operational progress states;
detecting, by a service processor in the compute node, a fault during the expansion card initialization in response to exceeding a predetermined time period in the current operational progress state;
storing an indication of the fault in the non-volatile memory, wherein the indication of the fault identifies the expansion card experiencing the fault;
the service processor causing a central processing unit on the compute node to exit from the expansion card initialization process in response to detecting the fault; and
the central processing unit, after exiting from the expansion card initialization process, starting a subsequent instance of the system mainline initialization process.

16. The method of claim 15, further comprising:
identifying, during the subsequent instance of the system mainline initialization process, the indication of a fault stored in the non-volatile memory; and
automatically bypassing, during the subsequent instance of the system mainline initialization process, the expansion card identified in the indication of a fault, wherein automatically bypassing the expansion card includes the central processing unit not executing expansion card initialization code in the read-only memory of the identified expansion card.

17. The method of claim 16, wherein the subsequent instance of the system mainline initialization process starts following a power cycle or reboot of the central processing unit.

18. The method of claim 15, wherein detecting a fault during the expansion card initialization in response to exceeding a predetermined time period in the current operational progress state, includes identifying a predetermined time period that is associated with a device type of the expansion card and the current operational progress state of the expansion card.

19. The method of claim 15, wherein the expansion card is selected from a network adapter, external storage expansion card, graphics processing unit, or an internal disk controller.

20. The method of claim 15, further comprising:
disabling a link to the expansion card in response to detecting the fault during the initialization of the expansion card.

* * * * *